June 14, 1932.  P. SZULCZEWSKI  1,863,210
DOUGHNUT COOKER AND TRIPPER
Filed Sept. 23, 1931   2 Sheets-Sheet 1
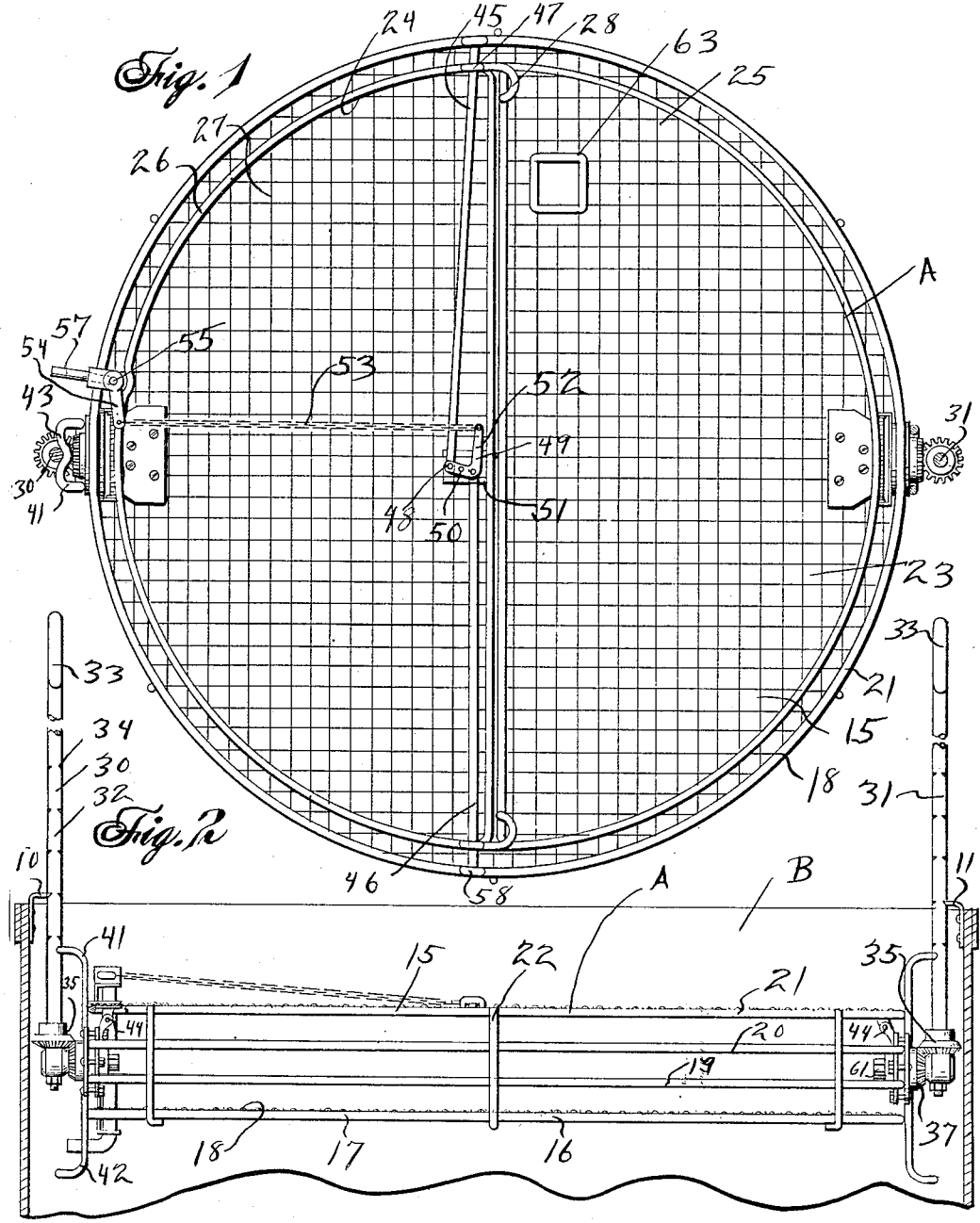
Inventor
Phillip Szulczewski
By Young & Young
Attorneys

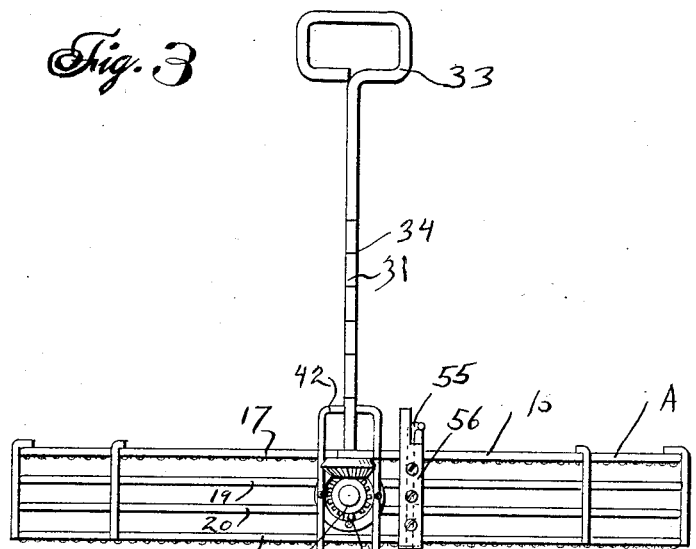
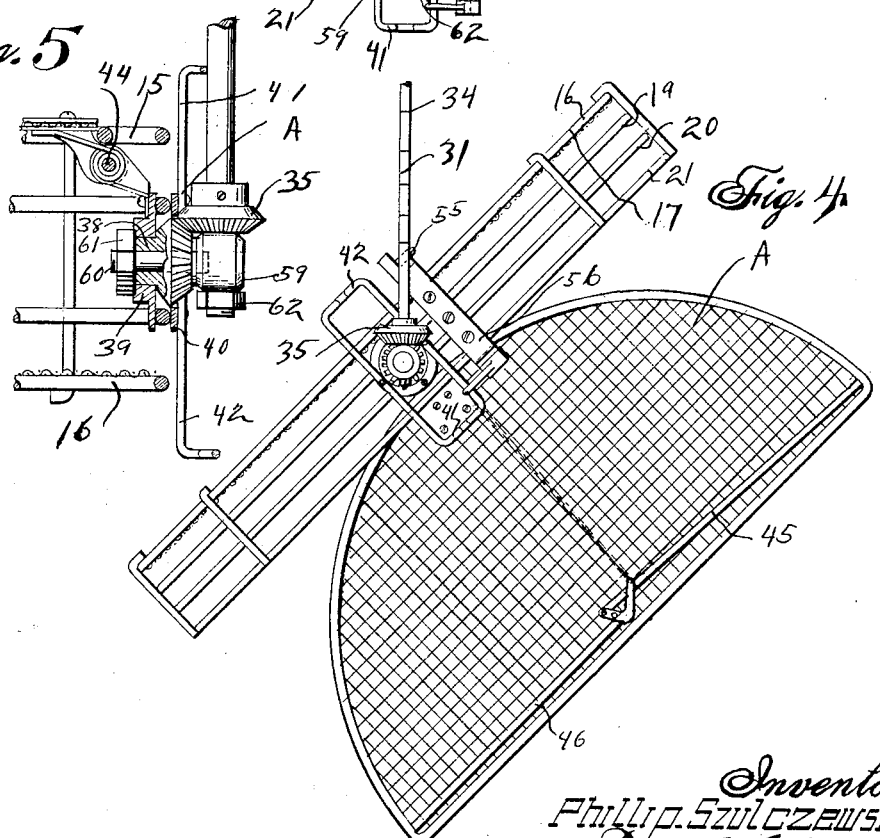

Patented June 14, 1932

1,863,210

UNITED STATES PATENT OFFICE

PHILLIP SZULCZEWSKI, OF MILWAUKEE, WISCONSIN

DOUGHNUT COOKER AND TRIPPER

Application filed September 23, 1931. Serial No. 564,595.

This invention appertains to a novel device for cooking articles of food, such as doughnuts, in vessels containing deep, hot grease.

One of the primary objects of my invention is the provision of a doughnut cooker having novel means for receiving the doughnuts and for holding the doughnuts embedded in the deep grease, with novel means for reversing the position of the doughnuts without removing the same from the cooking vessel, so that the doughnuts will be uniformly cooked and browned on both sides.

Another prime object of my invention is the provision of a novel device for cooking doughnuts, embodying a rotatable frame for receiving the doughnuts with novel supporting handles for the frame, the handles and frame having a novel connection whereby upon suitable manipulation of the handles, the frame can be turned over so as to permit the effective browning of the doughnuts on both the sides, with the expenditure of a minimum amount of time and effort.

A further important object of my invention is the provision of an improved doughnut cooker embodying a frame for receiving and supporting the doughnuts, the frame including a reticulated bottom section and a spaced reticulated upper section, the upper section being in the nature of a pair of movable doors for releasing the doughnuts after the same have been cooked, the frame being supported by novel manipulating handles, which provide means for rotating the frame so as to reverse the position thereof in the cooking vessel, means also being provided for automatically releasing the swinging doors after the frame has been reversed and the cooker removed from the cooking vessel.

A still further object of my invention is to provide an improved doughnut cooker of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which:

Figure 1 is a top plan view illustrating my improved doughnut cooker, the operating and supporting handles therefor being shown in cross section;

Figure 2 is a side elevation of my improved device showing the same in position within a cooking vessel, the vessel being shown broken away in in cross section;

Figure 3 is an end elevation of my improved device;

Figure 4 is a side elevation of my device, showing the same removed from the cooking vessel, with the doors tripped for automatically discharging the cooked doughnuts;

Figure 5 is an enlarged fragmentary elevation partly in section thru the operating mechanism.

Referring to the drawings in detail, wherein similar reference characters designate corresponding parts throughout the several views, the letter "A" generally indicates my improved doughnut cooking device, and "B" a cooking vessel with which the same can be associated.

The cooking vessel "B" can be of any preferred character and forms no part of the present invention, but the same must be of a sufficient size and depth to receive my improved device "A" so that the doughnuts carried thereby can be immersed in the deep fat or grease carried by the said cooking vessel. In accordance with my invention, however, I provide the sides of the cooking vessel "B" with resilient supporting brackets 10. These brackets are diametrically arranged relative to one another and include the inwardly directed resilient bevelled arms 11.

My improved device "A" comprises a rotatable frame 15, which forms an important part of the present invention. This rotatable frame 15 embodies a bottom reticulated circular wall 16. This lower wall 16 includes an annular ring or hoop 17 which supports a wire mesh netting 18. Arranged in spaced relation to the lower ring or hoops 17 are a plurality of rings 19, 20 and 21. These rings are all held in their proper spaced relation by upstanding supporting rods 22 which can be spot welded, or otherwise secured to said ring.

The rotatable frame embodies a top wall 23 which is in the nature of a pair of semi-circular doors 24 and 25, which are employed for automatically releasing the doughnuts, after the same have been cooked, as will be later described. Each of the semi-circular doors 24 and 25 include an outer wire frame 26 which is covered by wire mesh screening 27. When the doors 24 and 25 are in their closed position, as shown in Figures 1, 2 and 3, a flat circular top wall is provided. The inner ends of the wire frame 26, for the door 27 is provided with fingers 28 which overlie the door 25, when the doors are in their closed position, for the purpose which will also more fully appear as the description proceeds.

Diametrically disposed on opposite sides of the frame 15 are the vertically disposed supporting and manipulating handles 30 and 31. Each of the handles embody vertically disposed shanks 32 having hand grips 33 formed on the upper ends thereof. The shanks 32 are at equally distantly spaced points and on opposite sides thereof are provided with inwardly cut ratchet teeth 34 for cooperating with the arms 11 on the brackets 10 of the cooking vessel for holding the frame 15 in the vessel "B" during the cooking of the doughnuts. The lower terminal of the shanks of the handles 30 and 31 have keyed or otherwise secured thereto, bevelled gears 35, and these gears 35 mesh at all times with bevelled gears 37 arranged at right angles thereto. Each gear 37 includes a hub 38 which rigidly extends through a bearing plate 39 disposed on the inner sides of the intermediate rings 19 and 20 of the frame 15. On the outer sides of the frame 15 is a similar plate 40 and the two plates 39 and 40 on the opposite sides of the frame 15 can be rigidly connected together or to the frame 15 in any preferred manner. The plates 40 have bolted or otherwise secured thereto oppositely directed friction lock members 41 and 42 and when the frame 15 is in one position, the friction lock member 41 is adapted to engage the supporting handles or shafts 30 and 31, and when the frame 15 is in its reversed position, the friction lock members 42 are adapted to engage the handles or shafts 30 and 31.

As clearly shown in Figure 1 of the drawings, these friction lock members 41 and 42 are of a resilient nature and each includes a bight portion 43 for snapping in rear of the handles or shafts 30 and 31, so as to normally prevent swinging of the frame 15 on said handles.

The outer faces of the door members 24 and 25 are connected by means of spring hinges 44, with the inner plates 39 of the frame 15 and these hinges normally act to swing open the doors 24 and 25.

In order to normally hold the doors in their closed operative position, sliding latch bars 45 and 46 are carried by the door 24 adjacent to its inner edge, and these latch bars 45 and 46 extend through guide eyes 47 carried by the frame 26 of the door 24. The inner ends of the latch bars 45 and 46 are pivotally connected as at 48 to a swinging lever 49 on opposite sides of its pivot 50. The pivot 50 being carried by a plate 51, which is secured to the frame 26 and the wire mesh 27 of the door 24. This lever is provided with an operating crank 52 having connected therewith a pull chain 53, which leads to a swinging crank 54 keyed or otherwise secured to a shaft 55. This shaft 55 is rockably mounted within a supporting bearing 56 bolted or otherwise secured to the rings 17, 19, 20, and 21. The opposite end of the shaft 55 from the crank 54 is provided with a trip lever 57, the purpose of which will later be hereinafter more fully set forth.

Keepers 58 are carried by the uppermost ring 21 and these keepers are adapted to receive the outer ends of the latch bars 45 and 46 and thus, the latch bars function to hold the door 24 in its closed position. Obviously, when the door 24 is in its closed position and the arms 28 thereof engage the door 25, the door 25 will be held in its closed position. Any preferred means can be utilized for properly holding the bevelled gears 35 in mesh with the gears 37, and as shown, a hub block 59 is disposed on each side of the frame and each hub block 59 carries a stub shaft 60 which rotatably extends through the hub 39 of the bevelled gear 37. A retaining nut 61 can be employed for holding the stub shaft in its proper position. The terminals of the handles or shafts 30 and 31 extend through the hub blocks 59 and nuts 62 can be threaded on the terminal of the handles or shafts.

If preferred, suitable openings 63 can be provided in wire netting of the frame 15 in order to permit the expeditious insertion of a fork or the like inside of the frame for testing purposes, to see whether or not the doughnuts are done.

In operation of my improved device, the doors 24 and 25 are opened with the tension of their spring hinges, and doughnuts are then placed in the frame 15, after which the doors 24 and 25 are closed. The hand grips 33 are now grasped and the frame is inserted within the cooking receptacle "B" to the desired position, and the resilient arms 11 engaging in the notches 34 will hold the frame in this position.

After the doughnuts are sufficiently browned on one side, it is merely necessary to raise the frame and rotate the handles or shafts 30 and 31. Due to the meshing of the bevelled gears 35 and 37, the frame 15 will be rotated and turned over.

After the doughnuts have become browned on the other side, the hand grips 33 are again grasped and the entire frame is withdrawn from the cooking vessel and the frame is placed over a suitable pan or other receptacle for receiving the cooked doughnuts. The hand grips 33 are now rotated a one-quarter turn in the same direction as when they were previously rotated, which will bring the handle 57 of the shaft 55 in engagement with the frame 41. This will rotate the said shaft 55 and crank 54 will pull on the chain 53, which will turn the lever 49. The lever 49 will trip the latches 45 and 46 and move the same from out of engagement with the keepers 58. The frame 15 at this time will be in its inclined position, as shown in Figure 4 of the drawings, and the doors 24 and 25 will now automatically open, releasing the doughnuts into the pan.

The device can now be reloaded with the doughnuts and the same used in the same manner as just described.

From the foregoing description it can be seen that I have provided a novel device for cooking doughnuts in which the position of the doughnuts can be automatically reversed, so as to permit the browning thereof on opposite sides and in which the doughnuts can be automatically discharged after the same have been cooked.

Changes in details may be made without departing from the spirit or the scope of this invention, but what I claim as new is:

1. A device for cooking foods in deep grease comprising a reticulated frame for receiving and holding the food being cooked, said frame including release doors, supporting handles for turning the frame, and means for automatically releasing the trip doors when the frame is turned in a predetermined position.

2. A device for cooking articles of food in deep grease comprising a reticulated frame for receiving articles of food, rotatably supporting handles carried by the opposite sides of the frame, bevelled gears secured to the frame and extending outwardly from the opposite sides thereof, similar bevelled gears carried by the rotatable handles and meshing with the first mentioned bevelled gears, and for the purpose specified.

3. In a device for cooking articles of food in deep grease comprising a reticulated frame for receiving the articles of food, diametrically disposed bevelled gears carried by the opposite ends of the frame, rotatable handles associated with the frame, bevelled gears rotatable with the handles and meshing with the first bevelled gears, and resilient clips for engaging the handles at different times to normally prevent rotation of the frame.

4. In a device for cooking articles of food in deep grease, a reticulated frame including a body wall and a top wall, said top wall consisting of a pair of swinging doors, means normally urging the doors to an opened position, releasable latches for normally holding the doors in a closed position against the tension of said spring means, means for rotating the frame for reversing the position thereof, and means for automatically tripping the latches when the frame has been turned to a predetermined position.

5. In a device for cooking articles of food in deep grease, a rotatable frame consisting of a series of superposed hoops, a reticulated frame secured to the lowermost hoop, a pair of hinged doors hingedly connected to the opposite sides of the frame, spring means normally urging the doors to an open position, the doors being also formed of reticulated material, means carried by one door for engaging the other door for holding the same in a closed position, release latches carried by the first mentioned door for engaging the frame for normally holding the doors in a closed position, a trip shaft for actuating the latches, rotatably supporting handles for the frame, means for rotating the frame from the supporting handles, and means for automatically operating the trip shaft when the frame is rotated to a predetermined position.

In testimony that I claim the foregoing I have hereunto set my hand at Milwaukee, in the county of Milwaukee and State of Wisconsin.

PHILLIP SZULCZEWSKI.